United States Patent Office

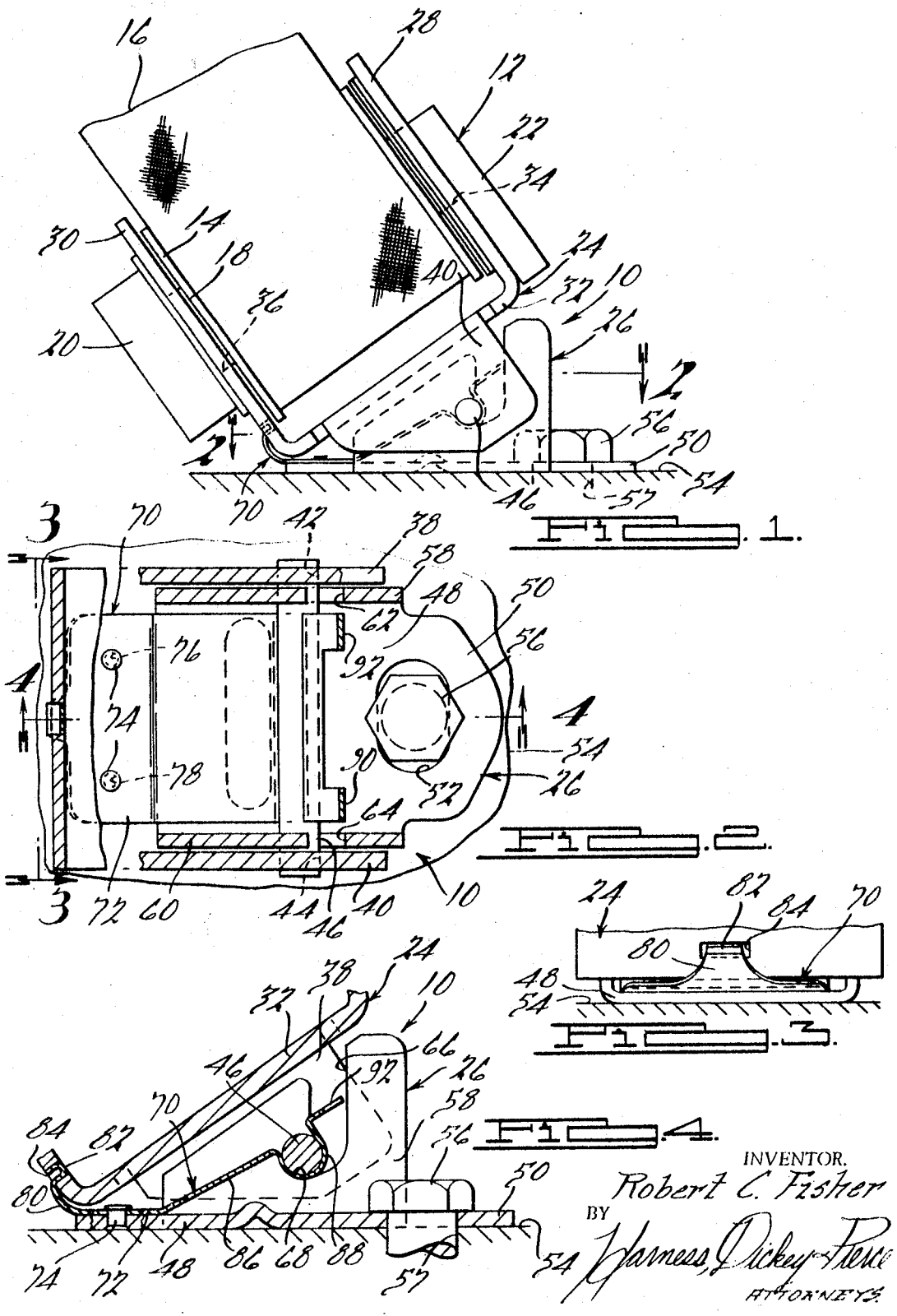

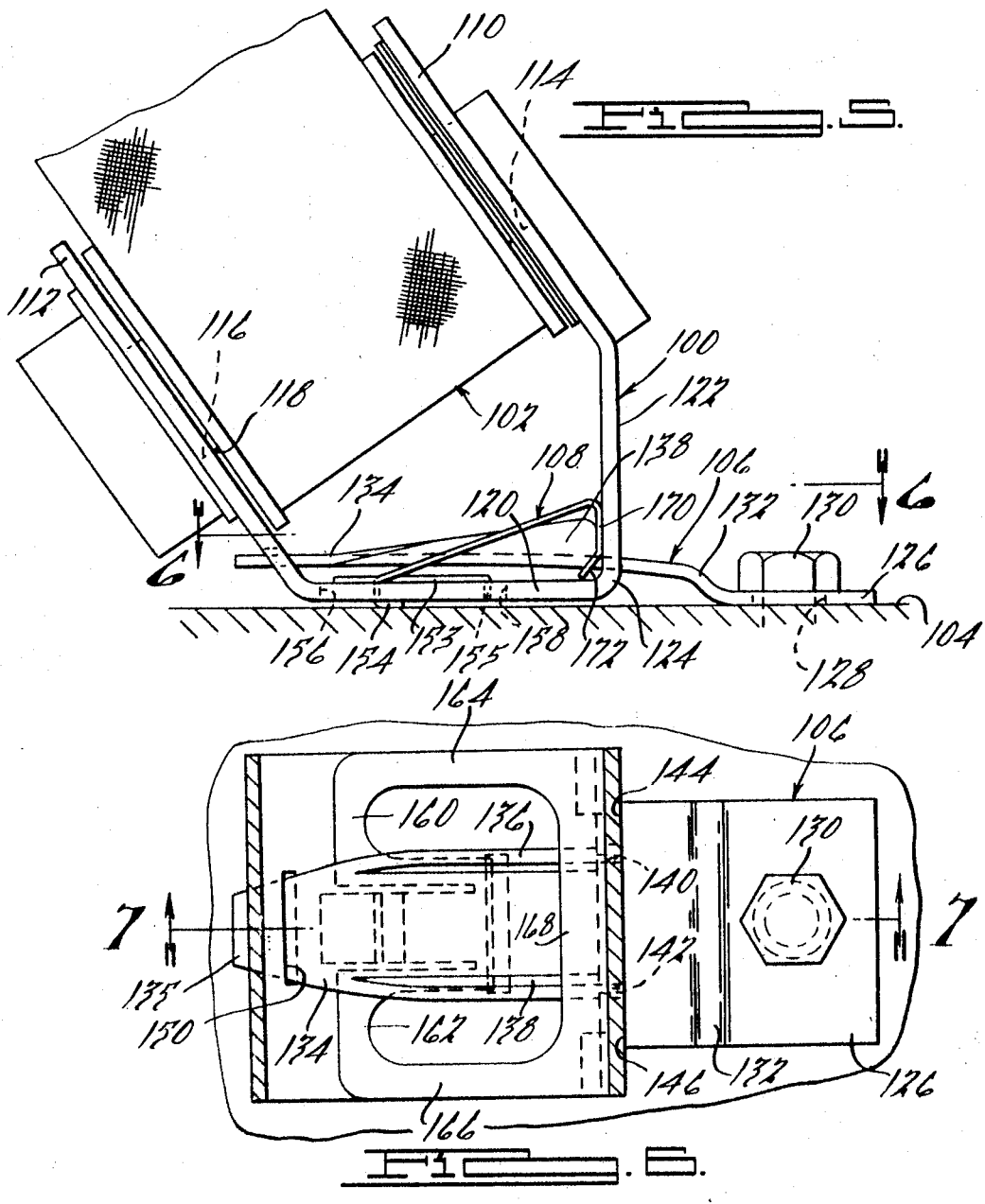

3,456,896
Patented July 22, 1969

3,456,896
BASE FOR SEATBELT RETRACTOR
Robert C. Fisher, 580 E. Long Neck Road,
Bloomfield Hills, Mich. 48013
Filed July 28, 1967, Ser. No. 656,913
Int. Cl. A62b *35/02;* A44b *13/02;* B65h *75/48*
U.S. Cl. 242—107     10 Claims

ABSTRACT OF THE DISCLOSURE

A seatbelt retractor support device comprising a bifurcated member adapted to operatively support the retractor mechanism in a position wherein a seatbelt may be freely unwound therefrom and subsequently wound thereon; a base member having one portion thereof fixedly mounted to an adjacent structure member of an associated automotive vehicle or the like, and another portion thereof adapted to lockingly engage the bifurcated support member, and spring means adapted to maintain the support member and base member lockingly engaged with one another.

Background of the invention

The advent of the use of devices for automatically locking seatbelts in a desired length as they are wound and unwound from an associated seatbelt retractor assembly has created a particularly bothersome problem in operatively mounting such retractor assemblies, for example, in automotive vehicles. This problem stems primarily from the fact that such seatbelt locking devices protrude outwardly from the retractor assemblies and thereby interfere to a very great extent with both the drilling of mounting holes for mounting the assemblies in a vehicle and with the installation of mounting screws, bolts or the like, through such holes, with the result that the retractor assemblies have been frequently damaged during the course of drilling the mounting holes or, at best, have been improperly oriented when finally installed.

In accordance with the present invention, the forgoing problem is completely overcome through the provision of a novel twopiece mounting device, the first of which is adapted to operatively support a seatbelt retractor assembly, and the second of which is adapted to be fixedly secured to the vehicle and thereafter be lockingly engaged with the first member for supporting the same and the seatbelt retractor secured thereto in a predetermined operative position. With this arrangement, the second member may be rigidly secured to the vehicle following the drilling of the requisite mounting holes and installation of the necessary mounting screws, bolts, or the like, prior to the first member which operatively supports the seatbelt retractor assembly being secured to the second member, thereby obviating the possibility of the retractor assembly incurring any damage during installation thereof and permitting the mounting device to be accurately positioned without any interference from the associated retractor assembly.

Summary of the invention

This invention relates generally to seatbelt retractor assemblies and, more particularly, to a new and improved mounting device for operatively supporting a seatbelt retractor assembly.

It is accordingly a general object of the present invention to provide a new and improved mounting device for operatively supporting seatbelt retractor assemblies, for example, in automotive vehicles.

It is a more particular object of the present invention to provide a new and improved mounting device for seatbelt retractor assemblies comprising two members, one of which is adapted to operatively support the seatbelt retractor assembly, and the other member of which is adapted to be fixedly secured to the vehicle and thereafter be lockingly secured to the first member.

It is another object of the present invention to provide a new and improved mounting device for operatively supporting seatbelt retractor assemblies which is of an extremely simple design, easy to assemble and economical to manufacture.

It is a further object of the present invention to provide a new and improved device of the above character which may be accurately positioned and is of an extremely durable construction so as to have a long operational life.

Other objects and advantages of the present invention will become apparent from the following detailed description, taken in conjunction with the accompanying drawings.

Brief description of the drawings

FIGURE 1 is a side elevational view of a preferred embodiment of the present invention, as shown in operative association with a typical seatbelt retractor assembly;

FIGURE 2 is a cross-sectional view taken substantially along the line 2—2 of FIGURE 1;

FIGURE 3 is a fragmentary cross-sectional view taken substantially along the line 3—3 of FIGURE 2;

FIGURE 4 is a fragmentary cross-sectional view taken substantially along the line 4—4 of FIGURE 2;

FIGURE 5 is a side elevational view of an alternate embodiment of the present invention, as shown in operative association with a typical seatbelt retractor assembly;

FIGURE 6 is a cross-sectional view taken substantially along the line 6—6 of FIGURE 5, and FIGURE 7 is a fragmentary cross-sectional view taken substantially along the line 7—7 of FIGURE 6.

Detailed description of the preferred embodiment

For purposes of clarity, the terms "inwardly" and "outwardly" will have reference to the geometric center of the seatbelt retractor assembly mounting device of the present invention and the various component parts thereof. Similarly, the term "upwardly," "downwardly" and derivatives thereof will have reference to the mounting device of the present invention, as shown in FIGURES 1 and 5.

Referring now to FIGURES 1 through 4 of the drawings, a seatbelt retractor assembly mounting device 10, in accordance with a preferred embodiment of the present invention, is shown in operative association with a typical seatbelt retractor assembly 12 having a spool 14 adapted to have a conventional fabric or similar type seatbelt 16 wound thereon. The spool 14 is rotatably mounted on a suitable shaft 18 having a seatbelt retracting spring mechanism 20 mounted on one end thereof and a seatbelt locking mechanism 22 mounted at the opposite end thereof. It will be noted that the seatbelt retractor assembly 10 per se does not constitute a material part of the present invention and therefore it will not be described in detail. By way of example, the assembly 12 may be of the type shown and described in the applicant's copending application for Locking Seatbelt Retractor, Ser. No. 629,689, filed Apr. 10, 1967, which is incorporated herein by reference as a part of the descriptive portion of this application.

Generally speaking, the mounting device 10 comprises a generally U-shaped or bifurcated support member 24 adapted to operatively support the retractor assembly 12, and a base member 26 having one portion thereof adapted to be fixedly mounted and another portion thereof adapted to be lockingly engaged with the support member 24, as will hereinafter be described.

Referring now in detail to the construction of the mounting device 10, as best illustrated in FIGURES 1 and 2, it will be seen that the support member 24 comprises a pair of upwardly inclined spaced parallel side sections 28 and 30 which are interconnected at their lower ends by an intermediate section 32 extending substantially perpendicular to the sections 28 and 30 and integrally formed therewith. The side sections 28, 30 are formed with aligned openings 34, 36, respectively, and are spaced apart a distance somewhat greater than the axial length of the belt spool 14, whereupon assembly of the retractor 12 and support member 24, the side sections 28, 30 are adapted to be interposed between the ends of the spool 14 and the spring and locking mechanisms 20 and 22, respectively, with the shaft 18 extending through the openings 34, 36. As shown in FIGURE 1, the side sections 28, 30 are of sufficient length such that upon rotation of the spool 14, as, for example, when the belt 16 is wound or unwound therefrom, there is no interference between the ends of the spool and the intermediate section 32 of the support member 24.

A pair of spaced parallel mounting flange sections 38 and 40 are formed integrally of and extend downwardly from the intermediate section 32 of the support member 24. As illustrated in FIGURES 1 and 2, the flange sections 38, 40 are arranged at right angles to the side sections 28, 30, and are formed with a pair of aligned openings 42, 44 within which the outer ends of a generally cylindrical locking shaft or bar 46 are fixedly secured. The locking bar 46 is adapted to function in a manner hereinafter to be described in lockingly securing the support member 24, and hence the retractor assembly 12 mounted thereon, to a base member 26.

Referring now to the base member 26, as best seen in FIGURES 2 and 4, the member 26 is shown as comprising a substantially flat, horizontally disposed mounting section 48 having an outwardly extending tab portion 50 within which a generally oval-shaped opening 52 is formed. The mounting section 48 is adapted to be fixedly secured to a suitable structural member, such as the floor or other chassis member 54 of an associated automotive vehicle (not shown). Means for thus securing the mounting section 48 is preferably provided by a suitable screw, bolt or similar type fastening member 56 which extends through the opening 52 and is threadably received within a suitable aperture 57 in the chassis member 54. It will be noted that the oval-shape of the opening 52 permits some limited amount of lateral adjustment of the base member 26 prior to the fastening member 56 being tightened.

Integrally connected to the mounting section 48 of the base member 26 along the laterally opposite sides thereof is a pair of upwardly extending, spaced parallel locking bar support sections 58 and 60. As illustrated in FIGURE 2, the sections 58, 60 are spaced apart a distance slightly less than the distance between the confronting face portions of the flange sections 38, 40, whereby the support sections 58, 60 may be nestingly received between the flange sections 38, 40. The support sections 58, 60 are formed with laterally aligned, generally J-shaped recessed portions 62 and 64, respectively, each of which portions comprises a generally vertically extending upper section 66 and an arcuate-shaped lower section 68.

Upon assembly of the support member 24 and the base member 26, the member 24 is positioned such that the flange sections 38, 40 are disposed on the outer sides of the support sections 58, 60 of the base member 26, and such that the locking bar 46 is aligned with the upper sections 66 of the recessed portions 62 and 64. Thereafter, the support member 24 is moved downwardly such that the locking bar 46 slides downwardly within the upper recessed sections 66. After the support member 24 has been biased to a position wherein the locking bar 46 engages the lower end of the recess sections 66, the support member 24 is biased toward the left in FIGURES 1, 2 and 4 relative to the fixed base member 26, with the result that the locking bar 46 moves into registry with the lower recess sections 68, as illustrated in FIGURE 4.

Means for lockingly securing the support membr 24, and hence the retractor assembly 12 supported thereon, in the above described position is provided by a retaining spring member, generally designated by the numeral 70. The spring member 70 is best illustrated in FIGURES 2 through 4 and comprises a generally flat intermediate section 72 extending parallel to the mounting section 48 of the base member 26 and adapted to be fixedly secured to the upper side thereof by means of suitable rivets or the like 74 extending through aligned apertures 76 and 78 formed in the intermediate section 72 of the spring 70 and the mounting section 48 of the base member 26, respectively. One end of the intermediate section 72 of the spring 70 terminates in an arcuate-shaped upwardly extending end section 80 which is formed with a reverse bend tang portion 82 adapted to be nestingly received within a suitable complementary-shaped opening 84 formed in the side section 30 of the support member 24. The opposite end of the intermediate section 72 of the spring 70 terminates in an upwardly extending inclined section 86 which is formed with a generally semicircular, laterally extending recessed portion 88 and a pair of outwardly extending tab portions 90 and 92.

Upon assembly of the support member 24 and base member 26, the recessed portion 88 of the spring 70 is adapted to "snap" into engagement with the locking bar 46 when the same is disposed within the lower recess section 68 of the base member 26. By virtue of the resilient character of the spring member 70, the locking bar 46 will be forced toward the left in FIGURE 4, thereby being positively secured within the recess section 68 of the base member 26. Simultaneously, the entire support member 24 will be forced toward the right in FIGURE 4 by means of the end section 80 of the spring 70, with the result that the support member 24 will be maintained under a state of compressive tension within the base member 26 by means of the spring 70, thereby positively lockingly securing the members 24 and 26 to one another.

From the foregoing, it will be seen that the base member 26 of the present invention is adapted to be operatively mounted on the chassis member 54 of the associated automotive vehicle prior to the support member 24 and retractor assembly 12 mounted thereon being attached to the base member 26. Accordingly, any holes which might need drilling in the chassis member for purposes of mounting the base member 26, i.e., the aperture 57, may be formed prior to the support member 24 and the retractor assembly 12 being mounted on the base member 26, thereby completely obviating the possibility of the retractor assembly 12 incurring any damage during installation thereof. Furthermore, the base member 26 may be accurately positioned with respect to the vehicle seats preparatory to the support member 24 and retractor assembly 12 being operatively mounted, thereby assuring proper orientation of the retractor assembly 12 upon installation thereof.

Referring now to FIGURES 5 through 7, an alternate embodiment of the seatbelt retractor mounting device of the present invention is shown as comprising a generally U-shaped support member 100 adapted to operatively support a retractor assembly of the type described in connection with FIGURES 1 through 4 and generally designated herein by the numeral 102. The support member 100 is adapted to be fixedly secured to a vehicle chassis member 104 by means of a base member 106 and retaining spring member 108, as will hereinafter be described.

As best shown in FIGURE 5, the support member 100 comprises a pair of upwardly inclined, spaced parallel side sections 110 and 112 which define aligned openings 114 and 116 through which a central shaft 118 of the retractor assembly 102 extends to operatively support the assembly 102 within the member 100. The lower end of the side section 112 terminates in a generally flat, horizontally disposed intermediate section 120, and the side section 110 terminates at its lower end in a generally vertically disposed intermediate section 122, the sections 120, 122 being integrally connected at 124 in a substantially right angle bend, as best seen in FIGURE 5.

The base member 106 comprises a generaly flat mounting section 126 which is formed with a central opening 128 adapted to receive a suitable screw, bolt or similar fastening member 130 for fixedly securing the base member 106 to an associated chassis member 104. One end of the mounting section 126 terminates in an upwardly extending arcuate-shaped intermediate section 132 which in turn terminates at the opposite side thereof in an elongated substantially flat locking section 134 having a converging outer end portion 135. As illustrated, the laterally outer sides of the locking section 134 are formed with upwardly extending, generally wedge-shaped flange portions 136 and 138 which define substantially flat, vertically extending face portions 140 and 142 along the sides thereof facing the base sections 126 and 132. The end of the intermediate section 132 of the base member 106 adjacent the locking section 134 thereof defines a pair of substantially coplanar shoulder portions 144 and 146 which are adapted to abut against the section 122 of the support member 100 upon assembly of the members 100 and 106, as shown in FIGURES 5 and 6.

Upon assembly of the support member 100 and base member 106, the locking section 134 is adapted to be inserted through a pair of substantially aligned openings 148 and 150 formed in the lower ends of the intermediate section 122 and side section 112, respectively, until the shoulder portions 144 and 146 abut against the outer side of the section 122 of the support member 100. It will be noted that the upper ends of the openings 148, 150 are formed with upwardly extending recessed portions 152 which accommodate the flange portions 136 and 138 extending upwardly from the locking section 134 of the base member 106.

Means for lockingly securing the members 100 and 106 in the assembled position thus described is provided by the aforementioned retaining spring 108 which comprises a generally flat lower section 153 having locking tab portions 154 and 155 formed at the opposite ends thereof. The spring section 153 is adapted to be fixedly secured to the intermediate section 120 of the support member 100 by having the tab portions 154, 155 inserted through and clampingly engaged with the sides of a pair of generally rectangular-shaped openings 156 and 158, respectively, formed therein, as shown in FIGURE 6. In a preferred construction, the lower end of the tab portion 154 is bent upwardly into engagement with the lower side of the support member section 120, as illustrated in FIGURES 5 and 7.

As best illustrated in FIGURE 6, the outer end of the spring section 153 is connected to a pair of laterally outwardly extending portions 160 and 162 that are substantially contiguously engaged with the upper surface of the support member section 120. The laterally outer ends of the spring portions 160 and 162 are formed with a pair of upwardly inclined leg sections 164 and 166, respectively, that terminate at their upper ends in a generally laterally extending connecting section 168 which is arranged immediately interiorly of the inner side of the support member section 122. The uppermost portion of the connecting section 168 is formed with a substantially vertically downwardly extending locking flange section 170 which, upon assembly of the locking section 134 of the base member 106 within the openings 148 and 150 of the support member 100, is adapted to be interposed between the face portions 140 and 142 of the flanges 136, 138 and the inner side of the support member section 122. The lowermost end of the locking section 170 is formed with a pair of downwardly and inwardly inclined tab portions 172 and 174 which are adapted to positively retain the flange section 170 in the locked position shown in FIGURES 5 and 6.

With the above construction, it will be seen that as the locking section 134 of the base member 106 is inserted through the opening 148 in the support member 100, the upwardly inclined upper face portions of the flange portions 136, 138 will force the locking flange section 170 of the spring 108 upwardly until such time as the flange section 170 is substantially aligned with the face portions 140, 142, i.e., the position illustrated in FIGURES 5 and 7, at which time the natural resilient character of the leg sections 164, 166 will result in the locking flange section 170 being urged resiliently downwardly interjacent the inner side of the support member section 122 and the face portions 140, 142. When this occurs, the support member section 122 is clampingly secured by the shoulder portions 144, 146 of the base member 106 and the locking flange section 170 of the spring 108, thereby positively precluding any relative movement between the support member 100, and hence the retractor assembly 102 mounted thereon, and the base member 106.

As was the case in the preferred embodiment of the present invention illustrated in FIGURES 1 through 4, it will be readily apparent that the base member 106 is adapted to be fixedly secured to the associated chassis member 104 preparatory to the support member 100 and retractor assembly 102 being secured to the base member 106, with the result that the retractor assembly 102 will not be subjected to any damage during the installation of the base member 106, and with the further result that the base member 106 may be accurately positioned relative to the vehicle seat preparatory to installation of the retractor assembly 102 to assure that the same will be properly located.

I claim:

1. In a device for mounting a seatbelt retractor assembly,
a first member comprising a mounting section adapted to be fixedly secured to an associated structure and an upwardly extending flange section defining a recessed portion,
a second member comprising a pair of spaced side sections adapted to operatively support the retractor assembly whereby a seat belt may be unwound and retracted thereon,
a locking bar member adapted to have one portion thereof connected to said second member and another portion thereof received within said recessed portion of said first member securing said first and second members together, and
spring means engageable with said locking bar for limiting movement thereof relative to at least one of said members.

2. A device as set forth in claim 1 wherein said spring means comprises a portion detachably engageable with one of said side sections of said second member.

3. A device as set forth in claim 1 wherein said first member comprises a pair of spaced upwardly extending flange sections defining aligned recessed portions adapted to nestingly receive a portion of said locking bar.

4. A device as set forth in claim 1 wherein said locking bar is operatively connected to downwardly extending flange portions formed on the lower side of said second member.

5. A device as set forth in claim 2 which includes a pair of upwardly extending flange sections on said first member defining aligned recessed portions adapted to nestingly receive a first portion of said locking bar, which includes downwardly extending portions on said second member adapted to be operatively connected to said second portions of said locking bar.

6. In a device for mounting a seat belt retractor assembly,
   a first member comprising a mounting section adapted to be fixedly secured to an associated structure and an elongated locking section having securing means thereon,
   a second member comprising a pair of spaced side sections for supporting the retractor assembly whereby a seat belt may be unwound and retracted thereon,
   means on said second member for nestingly receiving said locking section of said first member and thereby fixedly securing said first and second members together, and
   spring means engageable with said securing means on said locking section of said first member for limiting relative movement thereof relative to said second member.

7. A device as set forth in claim 6 wherein said securing means comprises a locking flange portion formed on said locking section of said first member.

8. A device as set forth in claim 6 wherein said second member comprises means defining a pair of aligned apertures adapted to have said locking section of said first member inserted therein.

9. A device as set forth in claim 6 wherein said spring means comprises a portion detachably engageable with said second member.

10. A device as set forth in claim 6 wherein said securing means comprises a locking flange portion formed on said locking section of said first member, wherein said second member comprises means defining a pair of aligned apertures adapted to have said locking section of said first member inserted therein, wherein said spring means comprises a portion detachably engageable with said second member.

References Cited
UNITED STATES PATENTS

| | | | |
|---|---|---|---|
| 2,282,653 | 5/1942 | Herzmark | 242—107 X |
| 2,377,640 | 6/1945 | Miller | 242—100 |
| 3,163,467 | 12/1964 | Deneau | 297—388 |
| 3,326,493 | 6/1967 | Bondesen et al. | 242—107.4 |
| 3,378,301 | 4/1968 | Romanzi et al. | 297—389 |
| 3,384,415 | 5/1968 | Monroe | 242—107.4 X |

FOREIGN PATENTS

| | | |
|---|---|---|
| 1,012,141 | 12/1965 | Great Britain. |

WILLIAM S. BURDEN, Primary Examiner

U.S. Cl. X.R.

24—236; 242—106; 297—388